March 13, 1973 A. SZEGVARI 3,720,379
TREATMENT OF DISPERSIONS
Original Filed Jan. 19, 1966 5 Sheets-Sheet 1

INVENTOR.
ANDREW SZEGVARI

ATTORNEY

INVENTOR.
ANDREW SZEGVARI

ATTORNEY

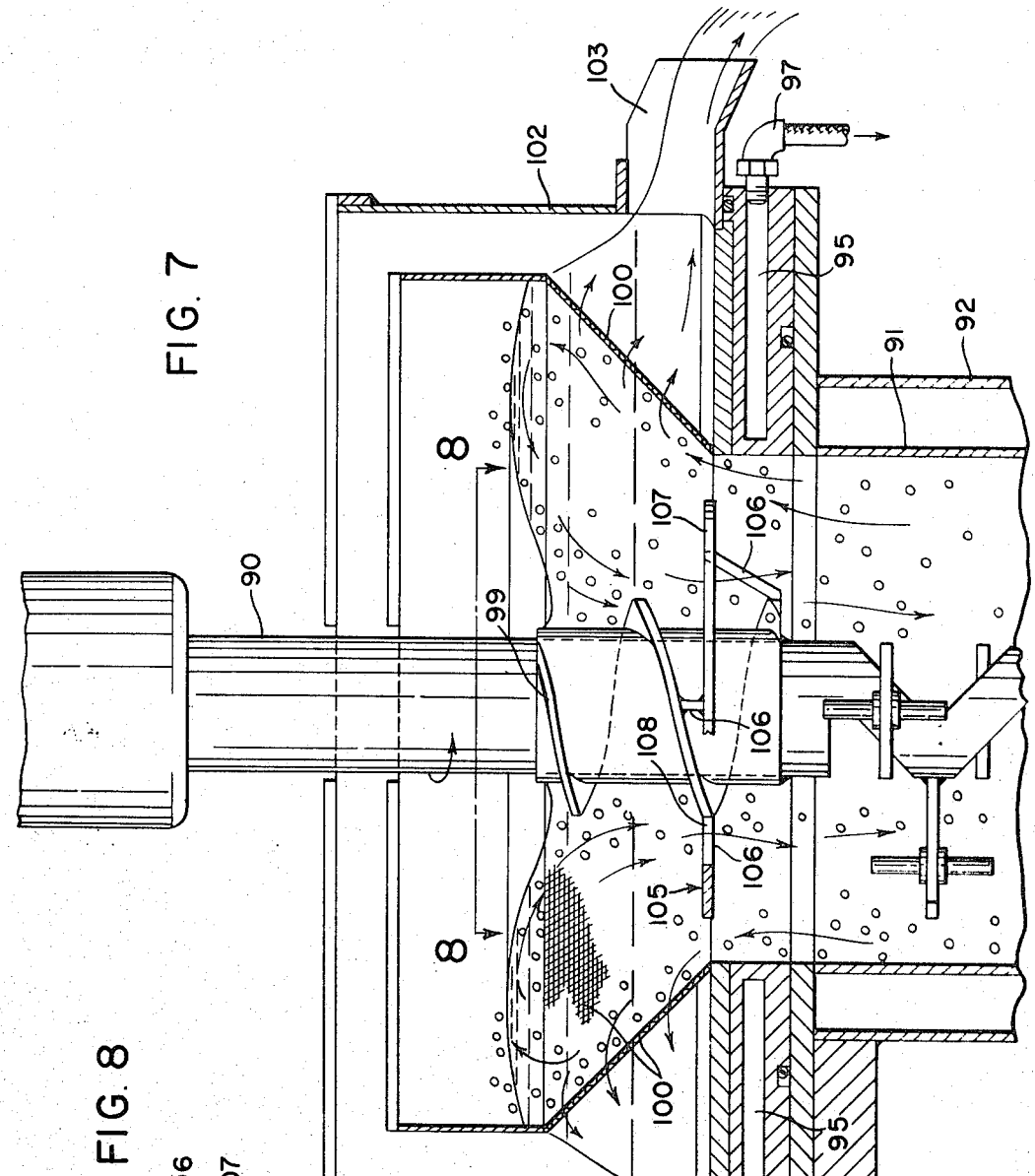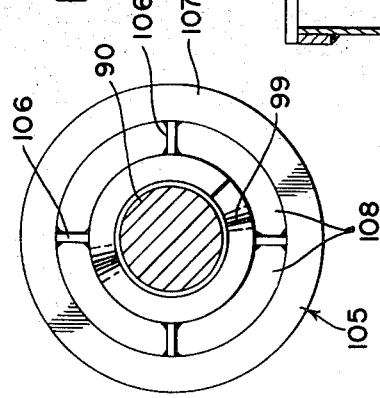

United States Patent Office 3,720,379
Patented Mar. 13, 1973

3,720,379
TREATMENT OF DISPERSIONS
Andrew Szegvari, 201 Castle Blvd.,
Akron, Ohio 44313
Application Jan. 19, 1966, Ser. No. 534,934, which is a continuation-in-part of abandoned application Ser. No. 407,716, Oct. 30, 1964. Divided and this application Jan. 31, 1969, Ser. No. 871,227
Claims priority, application Netherlands, Oct. 29, 1965, 6514055
Int. Cl. B02c 17/16
U.S. Cl. 241—20                                    6 Claims

ABSTRACT OF THE DISCLOSURE

Material is ground to a fine slurry in a liquid by kinetically activated grinding media. The liquid flows up through the vessel containing the grinding media and then through a screen at the top. The invention relates to preventing the grinding media from collecting on the surface of the screen which separates the grinding media from the slurry of ground material. Different embodiments of the apparatus are disclosed.

---

This application is a division of my application Ser. No. 534,934 filed Jan. 19, 1966, now 3,486,705, which is a continuation-in-part of my application Ser. No. 407,-716 filed Oct. 30, 1964 (now abandoned).

The invention relates to the dispersion of materials in a liquid by means of balls or other grinding media kinetically activated by means attached to a vertical shaft rotated at a desired speed and separating the balls from the dispersion at the top of the vessel in which the dispersion is formed by a screen and means is provided for preventing the balls from collecting on the surface of the screen.

The references herein to the use of spherical elements for agitating, are to be interpreted liberally to include balls and like agitating elements such as generally spherical sand, pebbles, etc., as known in the art. The spherical elements, whether larger or smaller, are all of substantially the same size, although if sand is used the particle size will generally vary somewhat more than if synthetic balls are employed. The use of such spherical elements for grinding or otherwise dispersing a material in a liquid, is well known in the art. See, for example, Szegvari U.S. Pat. 2,764,359.

In systems of this general type, there has been no satisfactory provision for separating the balls from the end dispersion. Vertical screens have been utilized which extend upward from the top of the wall of the dispersing chamber, but as the level of the liquid in contact with the screen varies and a portion of the screen which has been wet by the liquid becomes uncovered, a liquid such as a lacquer or the like dries on the screen and tends to close the openings therein. Horizontal screens have been more or less satisfactorily employed when larger balls have been used, but with smaller balls such as sand and synthetic balls $\frac{1}{16}$ inch or less in diameter, it has been impossible to keep the balls out of the space which must be left between the inner edge of the separating screen and the agitating shaft. On entering this space, these smaller balls become crushed and tend to jam the agitator shaft and contaminate the end product.

According to this invention, a retaining screen is provided to separate the balls from the end dispersion, whether a dispersion of a ground material or a liquid dispersion, and this screen is submerged in the dispersion at all times. In one embodiment, the screen slopes upwardly away from the central agitating means, near its top. Preferably, a disc projects horizontally from the shaft of the agitating means. The dispersion washes over the screen, carrying the agitator balls with it. The dispersion with entrained suspended matters passes through the screen and the balls are returned downwardly toward the center of the vessel, about the shaft, through the openings in the disc.

In the other embodiment, the retaining screen is substantially horizontal, and below this is a rotating spinner disc, usually attached to the agitator shaft, which counteracts the migration of the balls toward the underside of the screen. The spinner disc is located so close to the screen that there is a continuously changing velocity gradient field between the disc and the screen, imparted to the liquid by the rotation of the disc. An hydraulic impeller might be used to counteract this migration of the balls.

A generous space is provided between the shaft and the edge of the screen which is equal to at least three times the diameter of one of the balls, and may be substantially more, so that there is no danger of the balls becoming crushed in this space or jamming the agitator shaft. Above this space a housing, usually funnel-shaped, is provided in which a portion of the dispersion is collected as an open head at a height determined by the hydrostatic pressure prevailing there. When the spinner disc is in operation this height is materially reduced.

The diameter of the spinner disc is at least as large as that of the screen. It may be solid or it may be a screen. It is preferably flat although its edge may be cupped downwardly. Although it might seem that this disc, as it rotates, acts by centrifugal force in preventing an accumulation of the balls under the retaining screen, no assured explanation is offered here. Although it is understood how heavy balls such as steel balls $\frac{3}{16}$ inch in diameter, for example, would be deflected centrifugally by contact with the surface of such a spinning disc, the fact is that the disc is equally effective with glass or other lightweight balls as small as $\frac{1}{16}$ inch in diameter, the density of which is similar to that of the liquid in which they are suspended (which may be a viscous slurry), and they may float therein. The spinner disc is effective when operated as slowly as 250 r.p.m., as well as when operated at 1500 r.p.m. or more. Although designed paritcularly for use with small balls which measure up to $\frac{3}{16}$ inch in diameter, a disc such as here described may be used with larger balls.

The spinner disc is enclosed in an outwardly bulging housing which may be heated or cooled to control the temperature of the end product. Such control is of great value in the treatment of a lacquer, for example, where it is necessary to bring the temperature of the end product below the boiling point of the solvent.

The separator arrangement of this invention which permits the dispersion to flow down through a screen with return of the balls to the vessel, as in the first embodiment, or permits the dispersion to flow upwardly through a screen and thus out of the vessel in which the dispersion is produced, while retaining the balls in the vessel and preventing them from collecting under the screen and clogging it as in the second embodiment, may be used with agitators or different designs. A preferred agitator is shown herein in which there is a single zigzag shaft with agitator blades and activators attached thereto. It has been found that if the blades are attached to a straight vertical shaft there is a tendency for the liquid in contact with the shaft to move with it and to rotate the balls suspended therein around the shaft with little agitation of the balls on which the grinding action depends, whereas by making the shaft zigzag the immediately adjacent liquid and the balls suspended therein are kept constantly in a state of kinetic activation. The blades are preferably at different levels so that the activators are kept out of horizontal alignment and the action of one activator is, insofar as possible, independent of that of all of the other activators.

In what follows, the invention is further described more particularly in connection with the fine grinding of a solid, but the apparatus and process are equally adapted to the production of dispersions. In the drawings, FIG. 1 is a vertical section through apparatus equipped with the preferred agitator and a type of spinner disc such as described in connection with the second embodiment mentioned above;

FIG. 7 is an elevation of a type of equipment such as described in connection with the first embodiment mentioned above; and FIG. 8 is a section, on a reduced scale, on the line 8—8 of FIG. 7.

Figure 1:
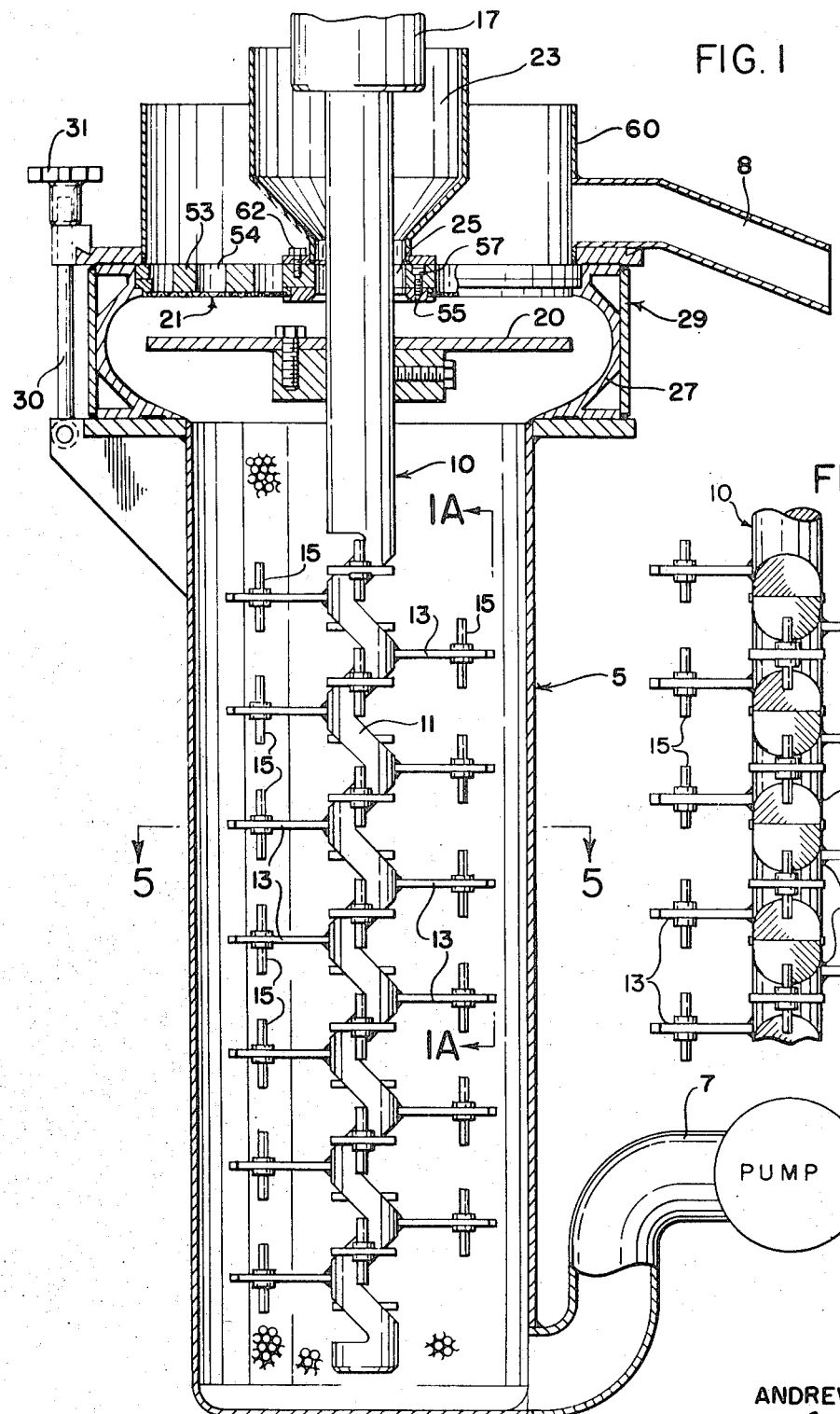
FIG. 1A is a view of a portion of this agitator on the line 1A—1A of FIG. 1.

Referring to the drawings, the vessel 5 is upright and cylindrical. A dispersion of the liquid and material to be ground is pumped continuously into the vessel through the inlet 7 and the dispersion of the finely ground material overflows away from the vessel through the outlet 8 due solely to the pressure exerted by the pump.

Figure 1A:
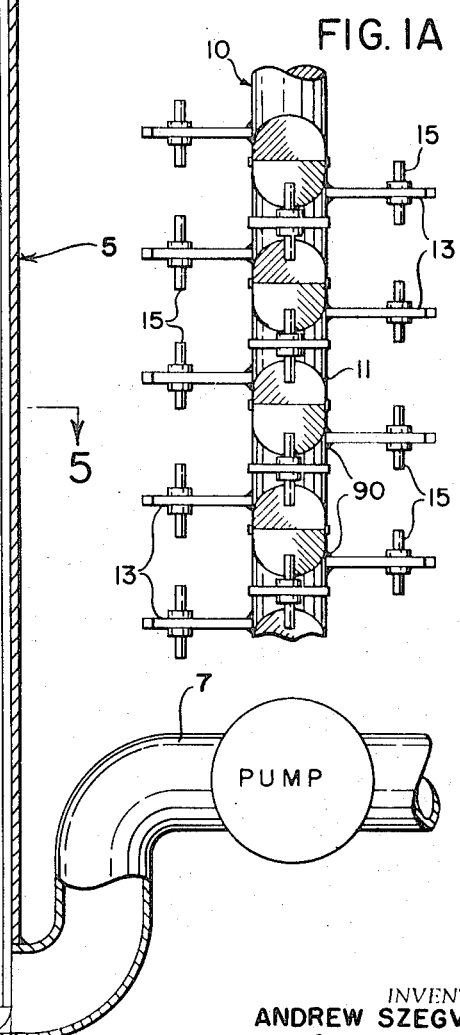

The top of the agitator shaft 10 is cylindrical and the bottom portion 11 which is milled from a cylindrical shaft, is flat with a zigzag contour, as clearly shown in FIGS. 1 and 1A. The agitator blades 13 which are horizontal and provide only minimum agitation of the liquid, are staggered around the shaft and, as shown, each is at a different level from the blade above and below it. A single activator 15 is provided in each blade. Activators of different shapes may be used, and in larger vessels they may be spaced different distances from the shaft 10. A preferred agitator is shown. If more than one activator is provided in each blade, these are preferably spaced at different distances from the shaft so that they make different paths. The blades are arranged so that they make different paths. In the arrangement shown, each blade is welded to the shaft at 90 degrees from the blade above and below it. The spacing of the blades around the shaft will depend upon the diameter of the vessel, etc. The agitator is rotated by suitable means, such as a belt about the upper part of the pulley 17. As the agitator is rotated there is relatively uniform agitation of the balls throughout the vessel, with minimum interference with the uniform upward streaming of the dispersion. The vessel is filled with balls which are spaced from one another by the kinetic energy imparted to them by the activators. The circular movement of the liquid dispersion within this vessel is minimized by keeping the frontal projection of the agitating means at a minimum, as by the construction shown, so that the dispersion rises through the vessel without appreciable rotation. A novel and preferred type of agitator is shown.

The means for retaining the balls within the vessel, shown in FIGS. 1 to 6, is of the type identified above as the second embodiment. It is applicable to apparatus equipped with different types of agitators, the only limitation being that the liquid dispersion rises in a vessel, and the dispersion is effected by balls which are activated by the rotation of a vertical shaft.

As the dispersion rises through the vessel it is diverted outwardly about the spinner disc 20 and flows over the disc. Most of the liquid rises through the screen 21 and is discharged. The small balance flows into the funnel-shaped central receptacle 23 and forms a head of liquid in the vessel, of greater or less height, according to the hydrostatic pressure prevailing at the bottom of this head, making it unnecessary to provide a confining top over the vessel. The screen 21 is continuously submerged in the liquid when the apparatus is in operation. The openings through the screen are so small that the balls cannot pass through them.

Between the inner rim of the screen 21 and the shaft 10 is a generous opening 25 which is at least as wide as three times the diameter of one of the balls, and may be larger. In the past, difficulty has been encountered with sand and other small balls such as porcelain, steel, etc. balls $\frac{1}{16}$ inch in diameter and smaller entering the space between the rim of the screen and the shaft and becoming crushed there, jamming the mechanism and contaminating the end product. In apparatus using larger balls this space has been made so small as to prevent the balls from entering it. The opening 25 in the apparatus of this invention, is at least three times the diameter of a single agitating ball, and it is immaterial whether the balls rise through this space or not. The opening 25 is located generally centrally of the screen. The wall of the housing 23 is sufficiently higher than the outlet 8 to prevent liquid from overflowing here.

The spinner disc 20 is preferably about the same diameter as the screen 21. It is fastened to the shaft 10 and rotates with it. As the dispersion rises in the vessel it flows over this disc. Without any spinner disc, the agitating balls collect on the undersurface of the screen 21 and eventually clog its openings. The rotation of the spinner counteracts the migration of the balls toward the screen without interfering with the continuous upward flow of the dispersion through the vessel. It is effective with small glass beads in a viscous liquid of a density similar to that of the balls, as well as with small balls much heavier than the liquid in which they are suspended. The physical reason for the action of the spinner is not explained here. The fact is, that by rotating this disc at the speed of the agitator which is ordinarily between about 250 and 1500 revolutions per minute, the balls do not accumulate under the retaining screen but remain relatively uniformly distributed throughout the entire space within the vessel in spite of the continuous flow of the dispersion up through the vessel and out through the screen. In order to accomplish this the spinner disc must be so near the screen that when the disc is rotating there is a continuously changing velocity gradient field between the disc and the screen, the velocity being greatest at the disc.

The spinner disc is substantially the same diameter as the area defined by the cylindrical wall 5 of the mill, although it may be more or less. Thus the wall bulges out at 27 above the top of the wall 5 to a diameter somewhat larger than that of the screen 21. It may be provided with means for heating or cooling the liquid passing through it. This top portion is enclosed in a box-like structure 29 which is clamped in place on different sides of the mill by pivoted screws 30 and nuts 31.

Figure 2:
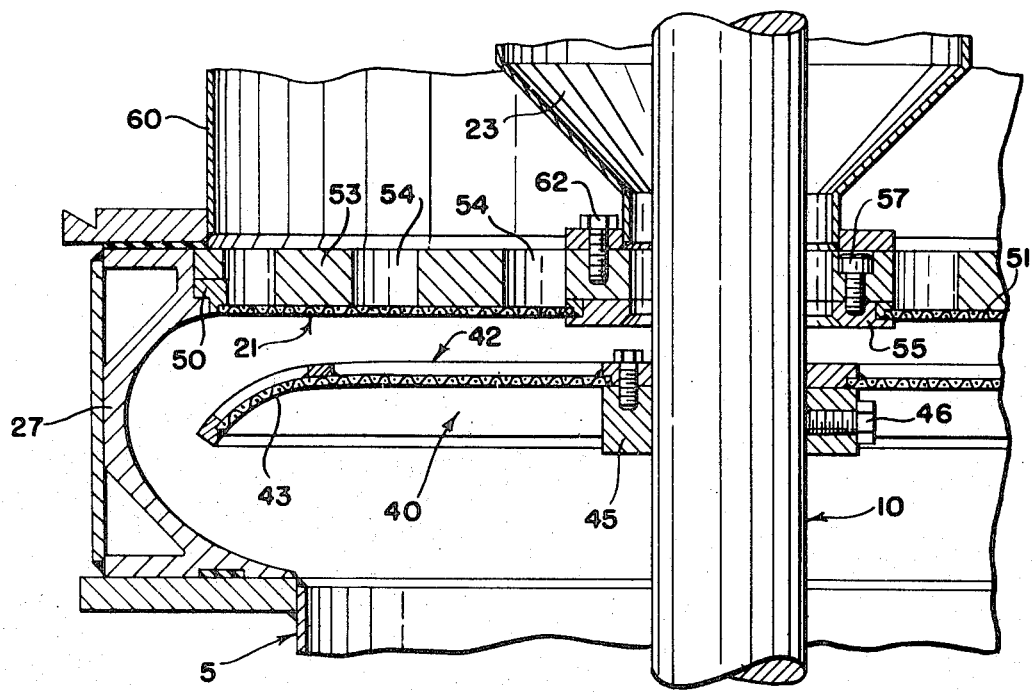
FIG. 2 is a section through a part of the top of apparatus equipped with a different type of spinner disc.

Instead of using a solid spinner disc 20, the disc is equally effective if it is made of a screen 40 as shown in FIG. 2. The construction of this screen is shown in the exploded view in FIG. 3, which also includes an exploded view of the screen 21. The spinner disc, as shown here, comprises the ribbed ring 42 to the bottom of which the screen 43 is fastened. The mesh of this screen is so small that the balls do not pass through it. The ring 42 is bolted to the ring 45 which, in turn, is bolted to the shaft by the setscrew 46.

Figure 3:
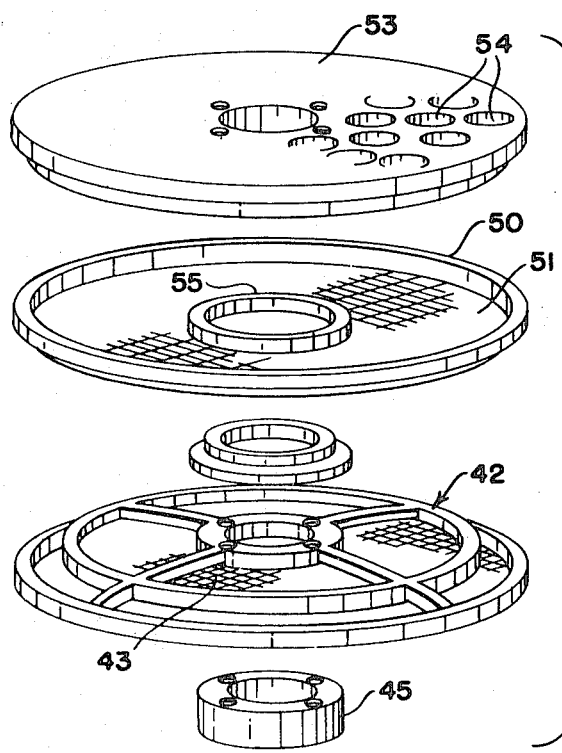
FIG. 3 is an exploded view of parts of the equipment shown in FIG. 2.

The parts of the screen 21 are clearly shown in FIG. 3. This screen includes the ring 50 to the bottom of which the screen 51 is attached. Its mesh is so small that the balls cannot pass through it. Over this is the back-up plate 53 with large openings 54 in it. This back-up member 53 is bolted to the inner ring 55 by bolts 57 (FIG. 2). The ring 50 is supported by the bulged wall 27. The container 60 which collects the dispersion which has passed through the screen 21 and delivers it to the overflow 8, is constructed as an integral part of the removable upper portion of the apparatus.

The funnel-shaped central receptacle 23 in which the head of the dispersion builds up is bolted to the back-up plate 53 by bolts 62. When the disc is rotated, there is an outwardly increasing speed gradient field in the space between the screen and the spinner disc, due to the action of the disc. This reduces the hydrostatic head of the liquid within the receptacle 23, so that this receptacle need not be very high.

Figure 4:
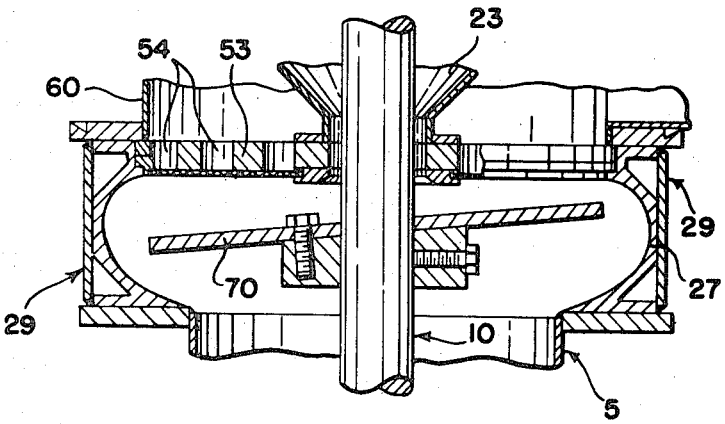
FIG. 4 is a view similar to the view shown in FIG. 2 but with the spinner disc tilted.
Figure 5:
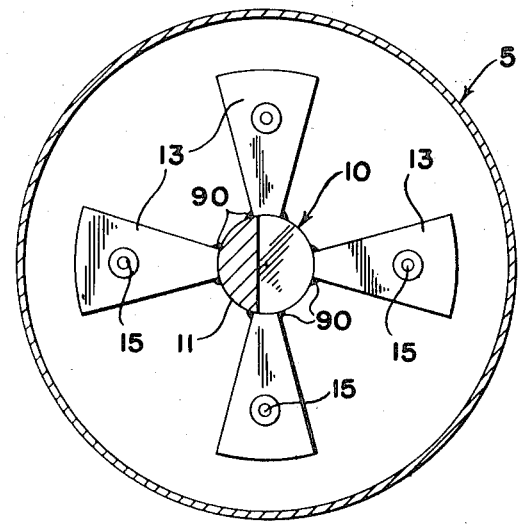
FIG. 5 is a horizontal section on the line 5—5 of FIG. 1.

It has been found that the spinner disc works somewhat better if it is not fastened horizontally to the shaft but is tilted somewhat, and in FIG. 4 the disc 70 is shown at an angle.

Figure 6:
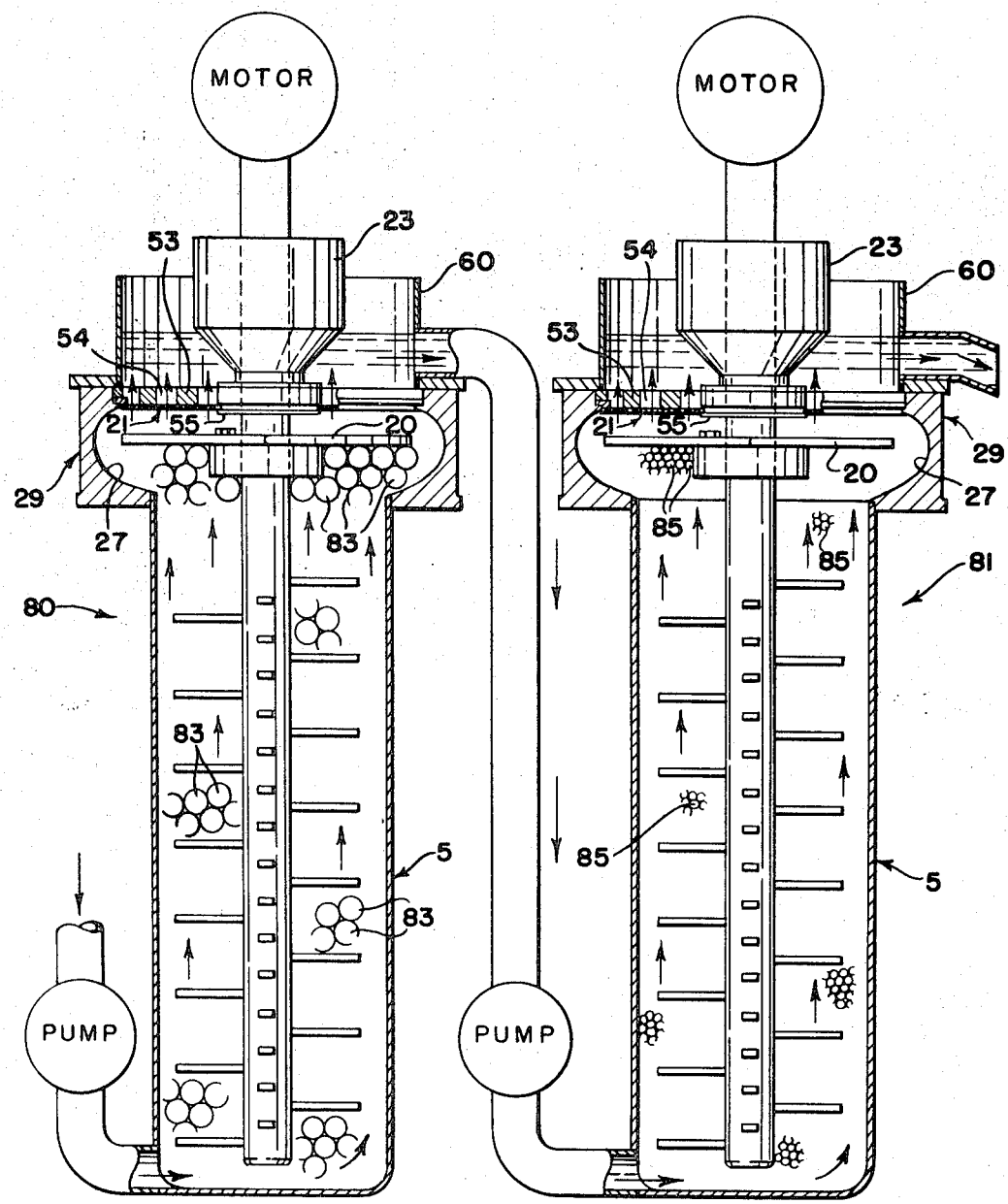
FIG. 6 is a vertical section of two agitator means in series.

Two or more dispersion units may be run in series, as indicated in FIG. 6 where two units 80 and 81 are shown. The agitator shafts are straight and although no activators are shown on the agitator blades, it is presumed that suitable activators will be provided. Such equipment does not grind or otherwise disperse as efficiently as the equipment shown which is equipped with a zigzag agitator shaft. A spinner disc 20 of the type illustrated in FIG. 1 is shown. The agitating balls 83 in the unit 80 are larger than the balls 85 in the unit 81. The larger balls 83 are designed for coarser grinding; and the smaller balls 85 in the unit 81 grind the dispersion of the material receiver from the unit 80 to a finer mesh. Such a series of units may be similarly used for producing liquid dispersions.

The means for retaining the balls within the vessel shown in FIGS. 7 and 8 is the type identified, above, as the first embodiment. It is applicable to apparatus equipped with different types of agitators, the only limitation being that the liquid dispersion rises in a vessel and the dispersion is effected by balls which are activated by the rotation of a vertical shaft. In both embodiments of the retaining means the retaining screen is at all times immersed in the dispersion, even though the volume of the dispersion contained within the equipment varies. If the variance in the volume of the liquid should expose some of the screen, the liquid would tend to dry on the screen with danger of clogging it.

The embodiment shown in FIGS. 7 and 8 is designed to increase the volume of throughput through the column. Spherical elements such as glass and zirconium oxide, and even sand measuring as small as 1/32 inch in diameter and as large as several inches can be used satisfactorily in this equipment.

The agitating means on the shaft 90 is of the type illustrated in prior figures, although it is to be understood that different types of agitating means may be employed. The chamber 91 is jacketed at 92 for regulation of the temperature within the chamber. Although heating means may be circulated through this jacket, usually a cooling liquid will be employed. The jacket may be connected with the cooling chamber 95 although it may be entirely separate therefrom. Liquid is introduced into the chamber 95 through the inlet 96 and removed through the outlet 97. The spiral 99 attached to the shaft 90 above the agitator is wound helically in the opposite direction from the helical spiral of the agitator and tends to return the agitator balls to the chamber. It causes the liquid adjacent the shaft to flow down into the top of the chamber 91 and liquid rises from the chamber 91 adjacent the chamber wall. It flows up through the screen 100 and here the balls are separated from the liquid dispersion. The dispersion is collected in the outer chamber 102 and drains through the outlet 103. The agitating balls circle over the screen, back toward the agitator, and are thus returned to the chamber. The disc 105 is fastened to the shaft 90 at about the level of the bottom of the screen 100. The bars 106 support the imperforate peripheral portion 107 and provide openings 108 through which the balls return to the chamber.

As the shaft is rotated the agitator activates the balls and these grind the solid or liquid suspension and produce a fine dispersion which flows up through the chamber 91. As it reaches the top of the chamber the upward flow is against the wall of the chamber and over the screen 100. The fine dispersion passes through the screen to the outlet 103 and the balls are returned to the chamber adjacent the shaft, through the openings 108.

The invention is covered in the claims which follow.

What I claim is:

1. The process of removing a liquid dispersion from a chamber and retaining in the chamber, by screening means, substantially spherical elements used for producing the dispersion therein, which process comprises forcing the dispersion up through the chamber and discharging it at the chamber top through said screening means while agitating the liquid contents of the chamber and hydrodynamically directing the movement of the spherical elements across the surface of the screening means and thereby preventing them from accumulating on the screen surface.

2. The process of removing a liquid dispersion from a chamber and retaining in the chamber substantially spherical elements used for producing the dispersion therein, by screening means which slopes upwardly from the top of the chamber, which process comprises forcing the dispersion up through the chamber and discharging it at the chamber top through said screening means, causing the spherical elements to flow up with the liquid adjacent the wall of the chamber and then over the screen and then inwardly away from the screen as the dispersion leaves the chamber through said screen and said spherical elements are retained by the screening means and return downwardly through the central portion of the top of the chamber, while agitating the liquid contents of the chamber and thereby preventing the spherical elements from accumulating on the screen surface.

3. The process of claim 1 during which the screening means is maintained submerged in the dispersion.

4. The process of removing a liquid dispersion from a chamber and retaining in the chamber, by horizontal screening means, substantially spherical elements used for producing the dispersion therein, which process comprises forcing the dispersion up through the chamber and discharging it at the chamber top through an opening which is generally centrally located with respect to the screening means, while agitating the liquid contents of the chamber and preventing the spherical elements from accumulating on the screen surface by rapidly rotating a spinner substantially immediately below the screen.

5. The process of claim 4 in which the spinner is rotated at a tilted angle.

6. The process of removing a liquid dispersion from a chamber and retaining in the chamber, by screening means, substantially spherical elements used for producing the dispersion therein, which process comprises forcing the dispersion up through the chamber and causing it to flow up adjacent the inner surface of the screen and then inwardly away from the screen and discharging it at the chamber top through said screening means while agitating the liquid contents of the chamber and thereby preventing the spherical elements from accumulating on the screen surface.

References Cited

UNITED STATES PATENTS

| | | | |
|---|---|---|---|
| 3,185,398 | 5/1965 | Hughes et al. | 241—20 |
| 3,172,609 | 3/1965 | Olsen et al. | 241—74 X |
| 1,956,293 | 4/1934 | Klein et al. | 241—46.15 X |
| 3,149,789 | 9/1964 | Szegvari | 241—172 X |
| 3,311,310 | 3/1967 | Engels et al. | 241—172 X |
| 3,385,529 | 5/1968 | Eckert | 241—46.15 |

GRANVILLE Y. CUSTER, Jr., Primary Examiner

U.S. Cl. X.R.

241—30, 46.15, 73